United States Patent
Nobushima (10) Patent No.: US 8,422,065 B2
(45) Date of Patent: Apr. 16, 2013

(54) PRINT DATA OUTPUT APPARATUS AND METHOD

(75) Inventor: Kouichi Nobushima, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 1323 days.

(21) Appl. No.: 12/216,194

(22) Filed: Jul. 1, 2008

(65) Prior Publication Data

US 2009/0033997 A1 Feb. 5, 2009

(30) Foreign Application Priority Data

Jul. 31, 2007 (JP) .................................. 2007-199429

(51) Int. Cl.
*G06F 15/00* (2006.01)
*G06K 1/00* (2006.01)

(52) U.S. Cl.
USPC .......... 358/1.16; 358/1.9; 358/1.13; 358/1.15

(58) Field of Classification Search .................. None
See application file for complete search history.

(56) References Cited

U.S. PATENT DOCUMENTS

2006/0181729 A1* 8/2006 Kuribara ..................... 358/1.14
2008/0218793 A1* 9/2008 Sugiura ..................... 358/1.15

FOREIGN PATENT DOCUMENTS

| JP | 2003-298819 A | 10/2003 |
| JP | 2004-272495 A | 9/2004 |
| JP | 2005-216019 A | 8/2005 |
| JP | 2006-99253 A | 4/2006 |
| JP | 2006-107377 A | 4/2006 |

* cited by examiner

*Primary Examiner* — Thierry Pham
(74) *Attorney, Agent, or Firm* — Jerald L. Meyer; Scott Langford; Nath, Goldberg & Meyer (57) ABSTRACT

An external storage unit managing system that specifies an external storage unit related to use from a plurality of the external storage units. The external storage unit managing system includes: an external storage unit retrieval unit that recognizes the external storage units connected to a print data output apparatus; and an external storage unit deciding unit that decides the desired external storage unit in a case where a plurality of the external storage units are retrieved by the external storage unit retrieval unit.

9 Claims, 6 Drawing Sheets

| DRIVE NAME |
|---|
| E |
| F |
| G |

23D, DATA

FIG. 3B

| DRIVE NAME | FOLDER NAME |
|---|---|
| E | [USR]-[SOURCE]-[PG1] |
| | [USR]-[SOURCE]-[PG2] |
| | [USR]-[SOURCE]-[PG3] |
| | [USR]-[SOURCE]-[PG4] |
| F | [RISO]-[USB]-[1-Folder] |
| G | [VIDEO]-[G1] |
| | [VIDEO]-[G2] |
| | [VIDEO]-[G3] |

27D, DATA

FIG. 3C

| DRIVE NAME | FOLDER NAME |
|---|---|
| F | [RISO]-[USB]-[1-Folder] |

31D, DATA

PRINT DATA OUTPUT APPARATUS AND METHOD

BACKGROUND OF THE INVENTION

1. Field of the Invention

The present invention relates to print data output apparatus and method, and more specifically, relates to a print data output apparatus including a desired external storage unit, to which the external storage unit is assigned as an output destination, and relates to a print data output apparatus.

2. Description of the Related Art

Heretofore, there has been known a printing system that allows an external storage unit (USB memory and the like) to store therein print data created by a print data output apparatus, and prints the print data by connecting the external storage unit to a printing machine. As such a printing system, one is assumed, in which one external storage unit is connected to one print data output apparatus for each printing operation, and accordingly, one output port just needs to be set in advance as an output destination on a printer driver side.

SUMMARY OF THE INVENTION

In such a conventional method, there has been a problem as follows.

In the system that allows the external storage unit (USB memory and the like) to store therein the print data created by the print data output apparatus, and prints the print data by connecting the external storage unit to the printing machine, there is a case where a plurality of the external storage units are simultaneously connected to the print data output apparatus. No consideration has been made as to how to specify a target external storage unit in the case of performing output processing of the print data for the external storage unit in a state where the plurality of external storage units are connected to the print data output apparatus.

It is an object of the present invention to provide a print data output apparatus capable of deciding the external storage unit as the output destination in a state as described above where the plurality of external storage units are connected to the print data output apparatus.

A first aspect of the present invention provides a print data output apparatus that decides an external storage unit related to use from among external storage units connected to a plurality of connection portions to which the external storage units are connectable, and outputs print data to the external storage unit based on a printing instruction, the print data output apparatus including: an external storage unit retrieval unit that retrieves the external storage units connected to the connection portions based on a command to use the external storage unit; and an external storage unit deciding unit that, in a case where a plurality of the external storage units connected to the connection portions are retrieved by the external storage unit retrieval unit, decides that an external storage unit satisfying predetermined conditions is the external storage unit related to the use from among the plurality of external storage units.

With the above-described configuration, in a state where the plurality of external storage units are connected to the print data output apparatus, a printer driver has means for selecting the external storage unit as the output destination and outputting the print data thereto. Alternatively, the printer driver has means for determining whether or not each of the external storage units has a folder configuration to which the print data is to be outputted, and outputting the print data to the external storage unit having the folder configuration. In such a way, the output destination can be specified to one even in the case where the plurality of external storage units are connected to the print data output apparatus.

Moreover, a configuration may be adopted, in which the external storage unit deciding unit has a display control function to allow a display unit to display thereon a selection screen capable of selecting respective names of drives to which the plurality of external storage units are connected, and the external storage unit deciding unit determines that the external storage unit corresponding to the name of the drive, which is selected on the selection screen, is the external storage unit related to the use while defining, as the predetermined conditions, that the name of the drive is selected on the selection screen.

Furthermore, in the above-described configuration, a configuration may be adopted, in which identification target information is stored in the external storage unit, and the external storage unit deciding unit determines whether or not prestored registered information and the identification target information coincide with each other, and determines that the external storage unit is the external storage unit related to the use while defining, as the predetermined conditions, that the registered information and the identification target information coincide with each other.

Furthermore, in the above-described configuration, a configuration may be adopted, in which the registered information has a predetermined folder configuration for outputting the print data, and the external storage unit deciding unit determines whether or not a folder having a same configuration as the predetermined folder configuration is present in the external storage unit, and determines that the external storage unit is the external storage unit related to the use in a case where the folder having the same configuration is present.

Furthermore, in the above-described configuration, a configuration may be adopted, in which a temporary folder is set in a local disk, a switching unit that freely switches between the temporary folder and the external storage unit related to the use is provided, and the switching unit switches a folder of the external storage unit related to the use to an output destination in a case of an output operation based on the command to use the external storage unit.

Furthermore, in the above-described configuration, a configuration may be adopted, in which a managing system of the external storage units is communicable with a peripheral apparatus through a network, a switching unit that freely switches between the peripheral apparatus and the external storage unit related to the use is provided, and the switching unit switches a folder of the external storage unit related to the use to an output destination in a case of an output operation based on the command to use the external storage unit.

A second aspect of the present invention provides a print data output method of deciding an external storage unit related to use from among external storage units connected to a plurality of connection portions to which the external storage units are connectable, and outputting print data to the external storage unit based on a printing instruction, the print data output method comprising the steps of: retrieving the external storage units connected to the connection portions based on a command to use the external storage unit; and in a case where a plurality of the external storage units connected to the connection portions are retrieved by the step of retrieving the external storage units, deciding that an external storage unit satisfying predetermined conditions is the external storage unit related to the use from among the plurality of external storage units.

DETAILED DESCRIPTION OF THE EMBODIMENTS

Figure 1:
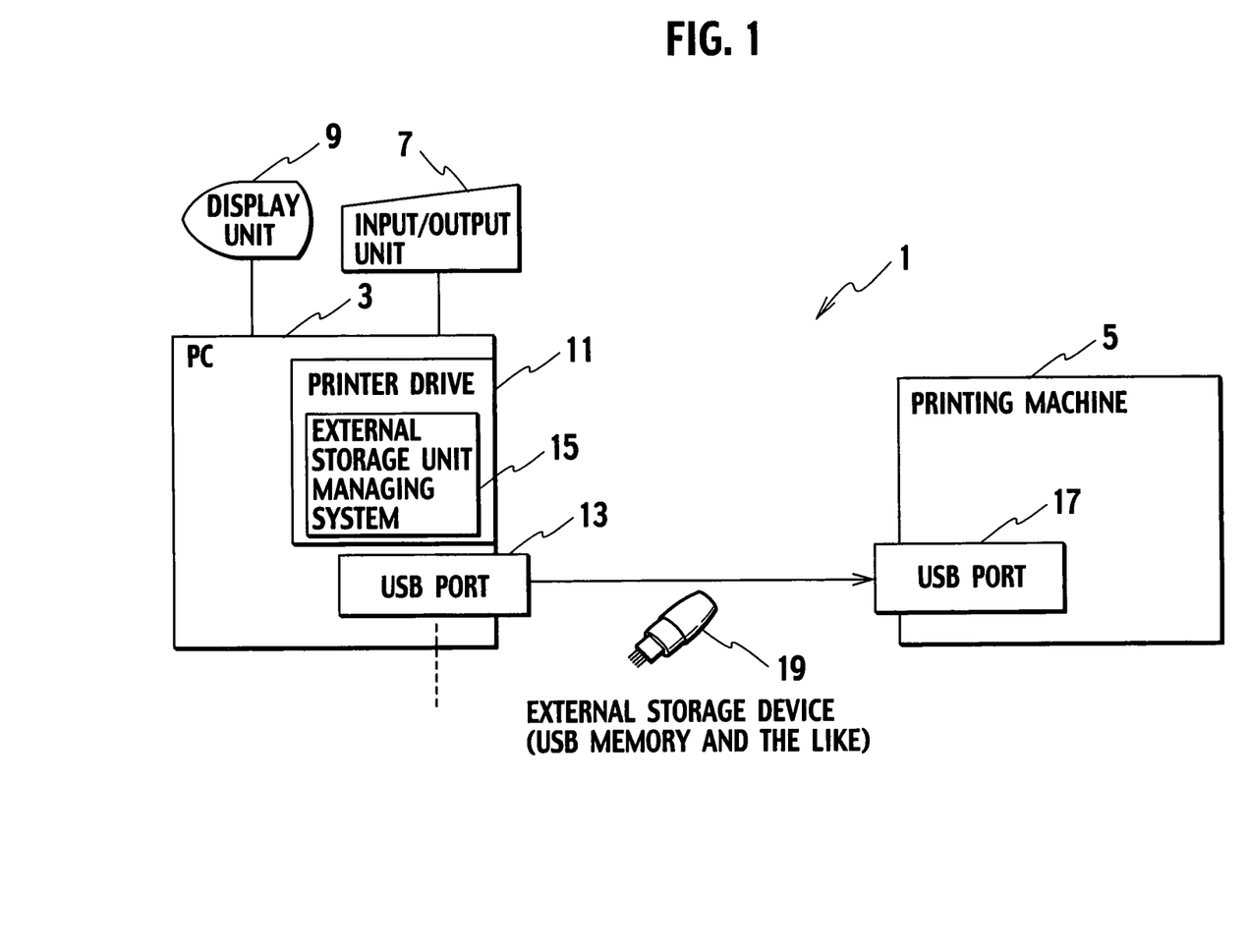
FIG. 1 is a configuration view explaining a configuration of a printing system including a print data output apparatus according to an embodiment of the present invention.

A description will be made of an embodiment of the present invention with reference to the drawings. FIG. 1 shows a schematic configuration of a printing system 1.

The printing system 1 includes a print data output apparatus 3 as a mode of a computer apparatus, and a printing machine 5. To the print data output apparatus 3, there are connected an input/output unit 7 such as a mouse and a keyboard, and a display unit 9 such as a CRT. In addition, the print data output apparatus 3 and the printing machine 5 are communicable with each other.

Moreover, the print data output apparatus 3 includes a printer driver 11, and a plurality of USB ports 13 (for example, corresponding to connection portions to which USB memories are connected). The printer driver 11 includes an external storage unit managing system 15. To the respective USB ports 13, external storage units 19 (USB memories and the like) are connected. Meanwhile, the printing machine 5 includes a USB port 17 to which at least one of the external storage units 19 is connected.

In the above-described printing system 1, in a state where the plurality of external storage units 19 are connected to the print data output apparatus 3, the printer driver 11 and the external storage unit managing system 15 have means for selecting the external storage unit (drive) 19 related to use (here, "use" incorporates at least a usage mode such as input and output) and outputting print data thereto. Alternatively, the printer driver 11 and the external storage unit managing system 15 have means for determining whether or not each of the external storage units 19 has a folder configuration as predetermined identification target information for use when the print data is outputted thereto, and outputting the print data to the external storage unit 19 related to the use in the case where the external storage unit 19 has the folder configuration as the predetermined identification target information.

Creation of the print data, the output of the print data, and management of the external storage unit 19 are enabled in such a manner that the printer driver 11 is installed, and that the external storage unit managing system 15 is installed.

The print data output apparatus 3 is equipped with the ports (USB ports in the case where the external storage units 19 are the USB memories) 13 which connect the external storage units 19 thereto. The printer driver 11 outputs the print data to the external storage units 19 connected to the USB ports 13.

The printing machine 5 prints the print data created by the printer driver 11. The printing machine 5 is equipped with the port (USB port in the case where the external storage unit 19 is the USB memory) 17 that connects the external storage unit 19 thereto. The external storage unit 19 to which the data is outputted on the print data output apparatus 3 side is connected to the USB port 17, whereby the print data is printed.

Here, a description will be made of a specific example of the above-described print data. Here, the print data refers to data transmitted from the printer driver 11 of an application to the printing machine 5 in the case of issuing a printing instruction on the application. As an example, data indicated by an identifier "prn" corresponds to the print data.

The external storage unit 19 is one called a "device having a removable storage area" and the like on an operating system (OS) of the computer apparatus (print data output apparatus 3 in this example).

Moreover, the external storage unit 19 is attachable to and detachable from the print data output apparatus 3 and the printing machine 5. Specifically, the external storage unit 19 is the universal serial bus (USB) memory, an SD card, a compact flash (CF) card, a floppy (registered trademark) disk, or the like. A description will be made below of the case of using the plurality of USB memories. Moreover, the case is assumed, where names of drives to which the USB memories 19 as the external storage units 19 are connected are set as an E drive, an F drive and a G drive.

Figure 2:
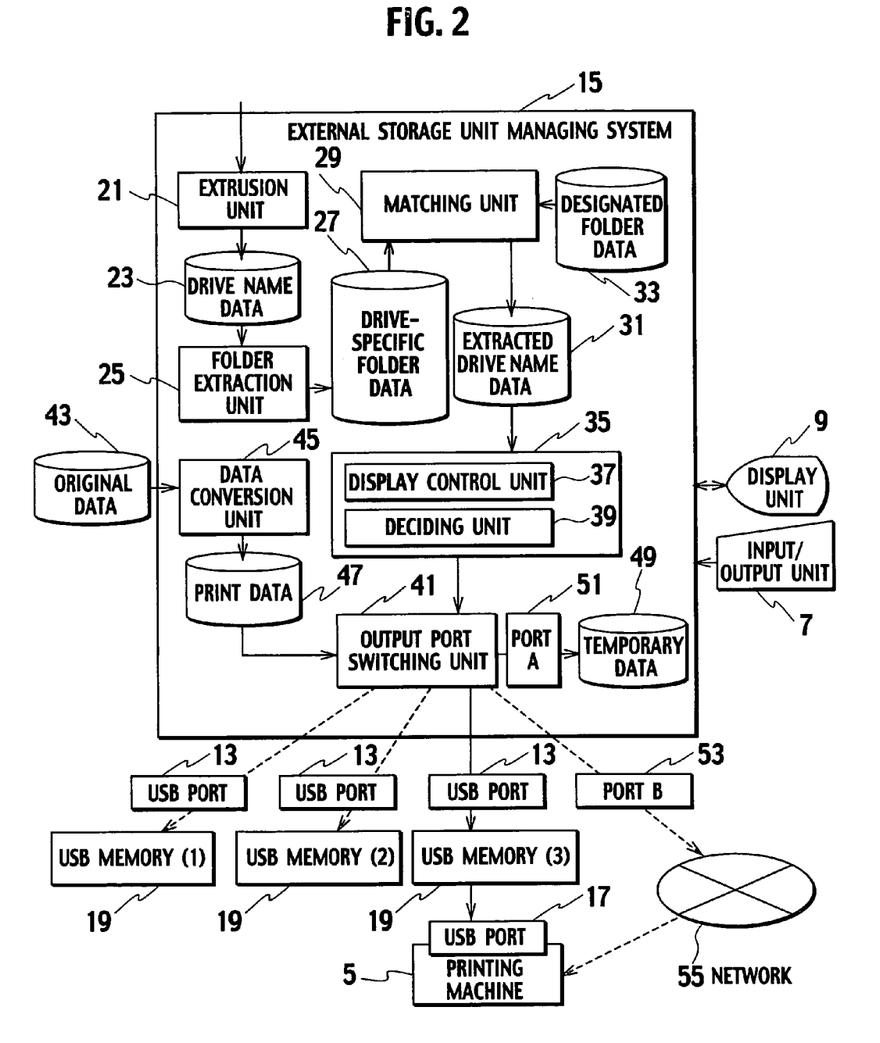
FIG. 2 is a configuration view explaining a schematic configuration of an external storage unit managing system in the embodiment.

A description will be made of a configuration of the external storage unit managing system 15 with reference to FIG. 2.

The external storage unit managing system 15 includes an extrusion unit 21, a drive name data memory 23, a folder extraction unit 25, a drive-specific folder data memory 27, a matching unit 29, an extracted drive name data memory 31, and a designated folder data memory 33. Here, the extrusion unit 21 and the folder extraction unit 25 function as external storage unit retrieval units.

Moreover, as described above, the case is assumed, where the names of the drives to which the USB memories (1) to (3) 19 as the external storage units are connected are set as the E drive, the F drive and the G drive.

The extrusion unit 21 extrudes internal disks and the like from memories (for example, the internal disks, the external storage units and the like) which the print data output apparatus 3 includes, and narrows target memories down to the external storage units (hereinafter, assumed to be the USB memories) 19. As a result, the connected USB memories (1) to (3) 19 are specified as drives E, F and G.

Figure 3A:
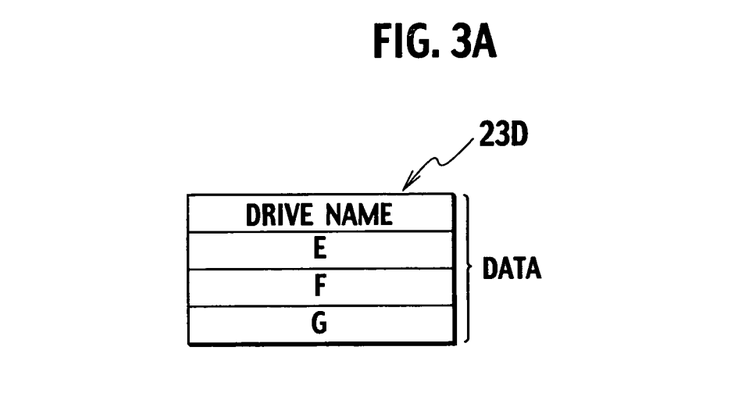
FIGS. 3A, 3B and 3C are explanatory views explaining data structures in the embodiment.

The drive name data memory 23 stores such drive names of the USB memories 19 narrowed by the extrusion unit 21. As a result, as shown in FIG. 3A, the drives (data) E, F and G are stored as drive name data 23D in the drive name data memory 23.

Figure 3B:
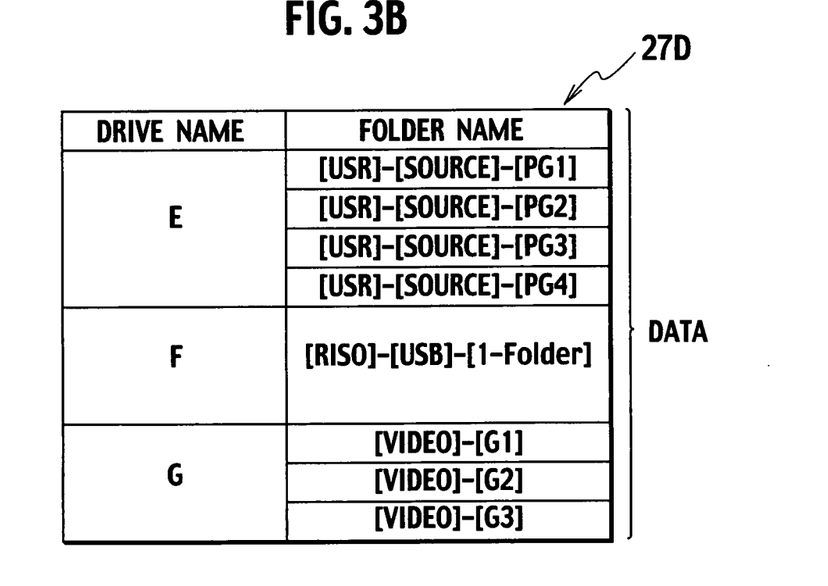

The folder extraction unit 25 extracts data (identification target information) of folder names created for each of the USB memories (1) to (3) (drive names E, F, G) 19. For example, as shown in FIG. 3B, the case is assumed, where folders (data 27D) which are [USR]-[SOURCE]-[PG1], [USR]-[SOURCE]-[PG2], [USR]-[SOURCE]-[PG3] and [USR]-[SOURCE]-[PG4] are extracted for the USB memory (1) (drive name E).

Moreover, the case is assumed, where a folder (data 27D) that is [RISO]-[USB]-[1_Folder] is extracted for the USB memory (2) (drive name F). Furthermore, the case is assumed, where folders (data 27D) which are [VIDEO]-[G1], [VIDEO]-[G2] and [VIDEO]-[G3] are extracted for the USB memory (3) (drive name G).

Meanwhile, in the designated folder data memory 33, a folder (data) that is [RISO]-[USB]-[1_Folder] is set in advance (registered information).

The matching unit 29 retrieves a folder name that matches with the folder [RISO]-[USB]-[1_Folder] from the drive-specific folder data memory 27. Then, specifically, the retrieved folder name coincides with the folder stored in the USB memory (drive F), and accordingly, the matching unit 29 defines the USB memory (2), which has the folder [RISO]-[USB]-[1_Folder], as the USB memory related to the use (where predetermined conditions are satisfied).

Figure 3C:
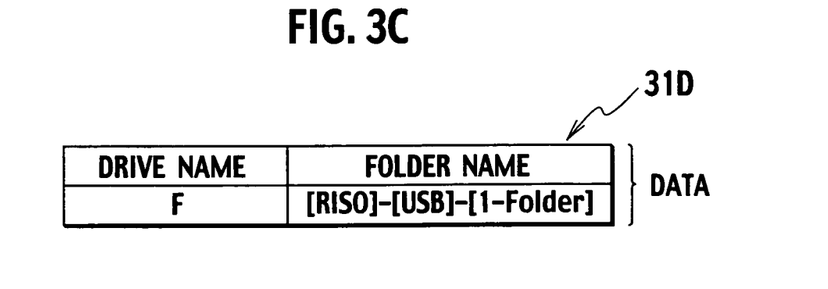

Then, as shown in FIG. 3C, data 31D composed of the USB memory (2) (drive name F) related to the use and of the folder [RISO]-[USB]-[1_Folder] is stored in the extracted drive name data memory 31.

The external storage unit managing system 15 includes an external storage unit deciding unit 35 that performs a control to decide the USB memory as an output destination to one, and an output port switching unit 41. The external storage unit deciding unit 35 includes a display control unit 37 and a deciding unit 39.

The display control unit 37 displays the drive names (E, F, G), which are stored in the extracted drive name data memory 31 and correspond to the respective USB memories, on a display screen so as to allow a user to select the drive name. Then, the deciding unit 39 decides, to one, the USB memory related to the use.

For example, the case is possible, where two or more USB memories having a predetermined folder ([RISO]-[USB]-[1_Folder] in this example) are retrieved. In this case, the plurality of drive names are displayed on the display screen of the display unit 9, and one of the drive names is then selected, whereby the USB memories can be limited to one.

Figure 7:
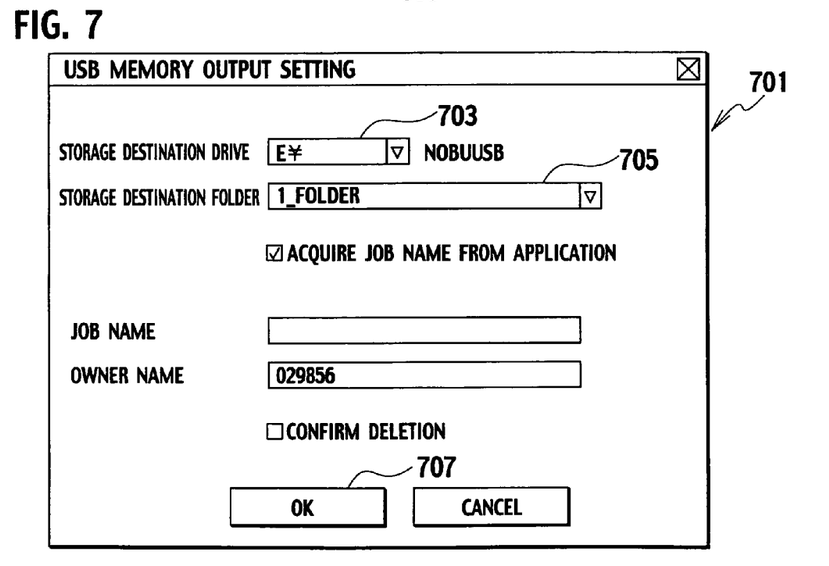
FIG. 7 is an explanatory view explaining an output destination setting screen in the embodiment.

Note that the display screen can be used in the case where the user decides the USB memory for use by directly designating the drive name thereof. For example, as shown in FIG. 7, the display screen may display all the drive names specified by the extrusion unit 21 so as to allow the user to select one of the drive names.

Meanwhile, an original data memory 43, a data conversion unit 45 and a print data memory 47 are provided. These are controlled by the printer driver 11.

The output port switching unit (switching unit) 41 appropriately switches among the USB ports 13, a port A (51) and a port B (53), which are the output destinations, in response to the USB memory (2) related to the use, which is decided to one by the deciding unit 39. Then, the switching unit 41 outputs the print data to the USB memory (1) 19, the USB memory (2) 19, the USB memory (3) 19, a temporary folder 49, a network 55 or the like. Then, when the print data is outputted to the network 55, the print data is then outputted from the network to a peripheral apparatus (printing machine 5 in this example).

The external storage unit managing system 15 is composed as described above, and configurations of the printer driver 11 and others are made as follows.

The printer driver 11 converts original data into the print data, and outputs the print data to a specific output port. Accordingly, the printer driver 11 is composed to set the output port without fail.

Moreover, in the case where the print data output apparatus 3 and the printing machine 5 as one mode of the peripheral apparatus as described above are connected to each other by the network 55, a network port (TCP/IP port or the like) becomes the output port. In the case where the print data output apparatus 3 and the printing machine 5 are connected to each other by a parallel cable, a parallel port (LPT port or the like) becomes the output port.

Moreover, the following can be realized. In a usual case, since the printing is performed by using the USB memory, a destination of the output port set by the printer driver 11 becomes the USB memory (in this case, a full pathname of the USB memory, which is E:¥Folder¥Output.prn, is registered as a local port in advance, and so on). In this case, drives to which the USB memory is connected are limited to the E drive. When the USB memory is connected to the USB port in a state where an external HDD as another USB instrument is connected to the E drive that is usually used, the USB memory is undesirably recognized as the F drive, leading to noncoincidence with the pathname designated by the local port, causing a problem that the output of the print data fails. In a similar way, also in the case where the plurality of USB memories are connected to the drives, the print data is outputted to the USB memory connected to the E drive. Accordingly, if the USB memory to be actually used for the printing is recognized to be connected to the F drive, and the USB memory to be used for another purpose is recognized to be connected to the E drive, then there is a problem that the print data is undesirably outputted to the unintended USB memory designated by the local port. In the embodiment of the present invention, when the print data is outputted to the USB memories, the output ports are switched on the external storage unit managing system 15 side. Accordingly, when the plurality of USB memories are connected to the USB ports, the USB memory related to the use can be selected.

Moreover, the following configuration can also be adopted, in which, in the case of outputting the print data to the USB memory, a temporary port (for example, a local port having a full pathname of C:¥dummy.prn or the like) is set in advance as the output port switched on the external storage unit managing system 15, and in the case where "Output to USB Memory (command to use external storage unit)" is selected by a UI (refer to FIG. 6) of the external storage unit managing system 15, the printer driver automatically switches the output destination to the USB memory.

Specifically, when "Output to USB Memory" is selected, the external storage unit managing system 15 detects the drive to which the USB memory is connected, and outputs the print data to an arbitrary folder of the drive concerned. The external storage unit managing system 15 does not output any data to the temporary port.

Figure 6:
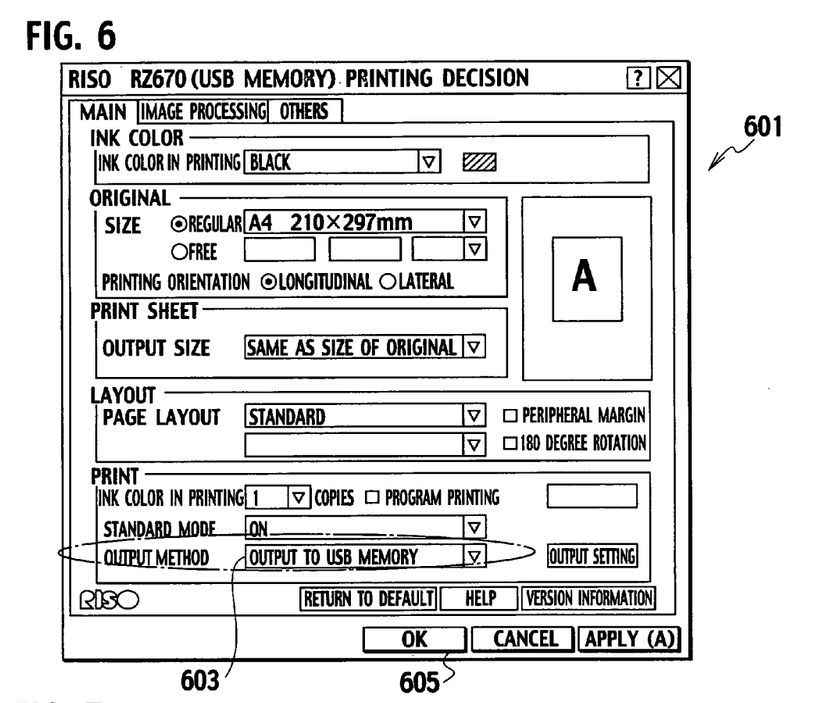
FIG. 6 is an explanatory view explaining a printing method setting screen in the embodiment.

Moreover, when there is provided such means for switching the output destination by the external storage unit managing system 15, the following configuration is also made possible, in which the data is usually outputted by network connection (in which the output port is the TCP/IP port), and when the print data is desired to be outputted to the USB memory, the print data is outputted to the USB memory by selecting "Output to USB Memory" on "Output Method" in FIG. 6.

Furthermore, when the plurality of USB memories are connected to the drives, it becomes possible to select the USB memory by selecting a storage destination (output destination) by a UI (refer to FIG. 7) of the printer driver.

Specifically, on "Storage Destination Drive", the drive of the print data output apparatus 3, to which the USB memory is connected, is displayed, and the user can select the drive name (E:¥ or the like having one alphabetic character). Meanwhile, a volume name (name assigned to the USB memory itself) is displayed as a supplement by the right side of the drive name. Then, the print data is outputted to the arbitrary folder of the USB memory connected to the drive selected by "Storage Destination Drive".

The USB memory to which the data is to be outputted has a specific folder configuration. This is because the printing using the USB memory cannot be realized unless an output destination folder of the print data of the printer driver and a read destination folder of the print data of the printing machine coincides with each other.

As described above, the folder configuration named [RISO]-[USB]-[1_Folder] is created in the USB memory, the printer driver outputs the print data into [1_Folder], and the printing machine prints the data contained in [1_Folder].

The specific folder configuration can be created by the external storage unit managing system 15 or the printing machine 5. Here, in the case where the USB memory (2) having the specific folder configuration and the USB memories (1) and (3) having no specific folder configuration are connected to the print data output apparatus 3, it is possible for the external storage unit managing system 15 to output the print data to the USB memory (2) having the specific folder configuration.

Figure 4:
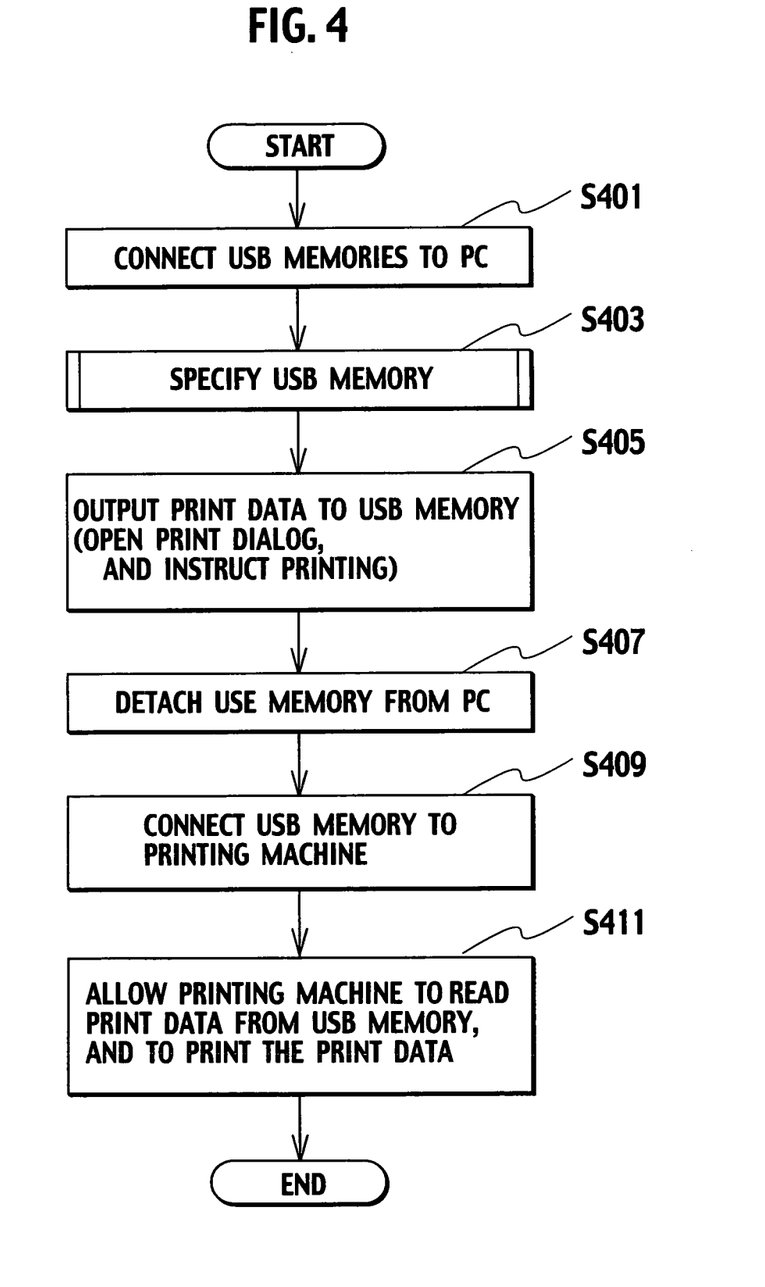
FIG. 4 is a flowchart showing operations of the printing system in the embodiment.

Next, a description will be made of operations of the printing system 1 with reference to FIG. 4.

In Step S401, the USB memories are connected to the print data output apparatus 3. In Step S403, the external storage unit managing system 15 specifies one of the USB memories, which is related to the use. In Step S405, the printer driver 11 outputs the print data to the USB memory related to the use, which is decided by the external storage unit managing system 15 (a print dialog is opened, and the output of the print data is instructed). In Step S407, the USB memory related to the use is detached from the print data output apparatus 3. In Step S409, the USB memory related to the use is connected to the printing machine 5. In Step S411, the printing machine 5 reads the print data from the USB memory related to the use, and prints the print data.

Figure 5:
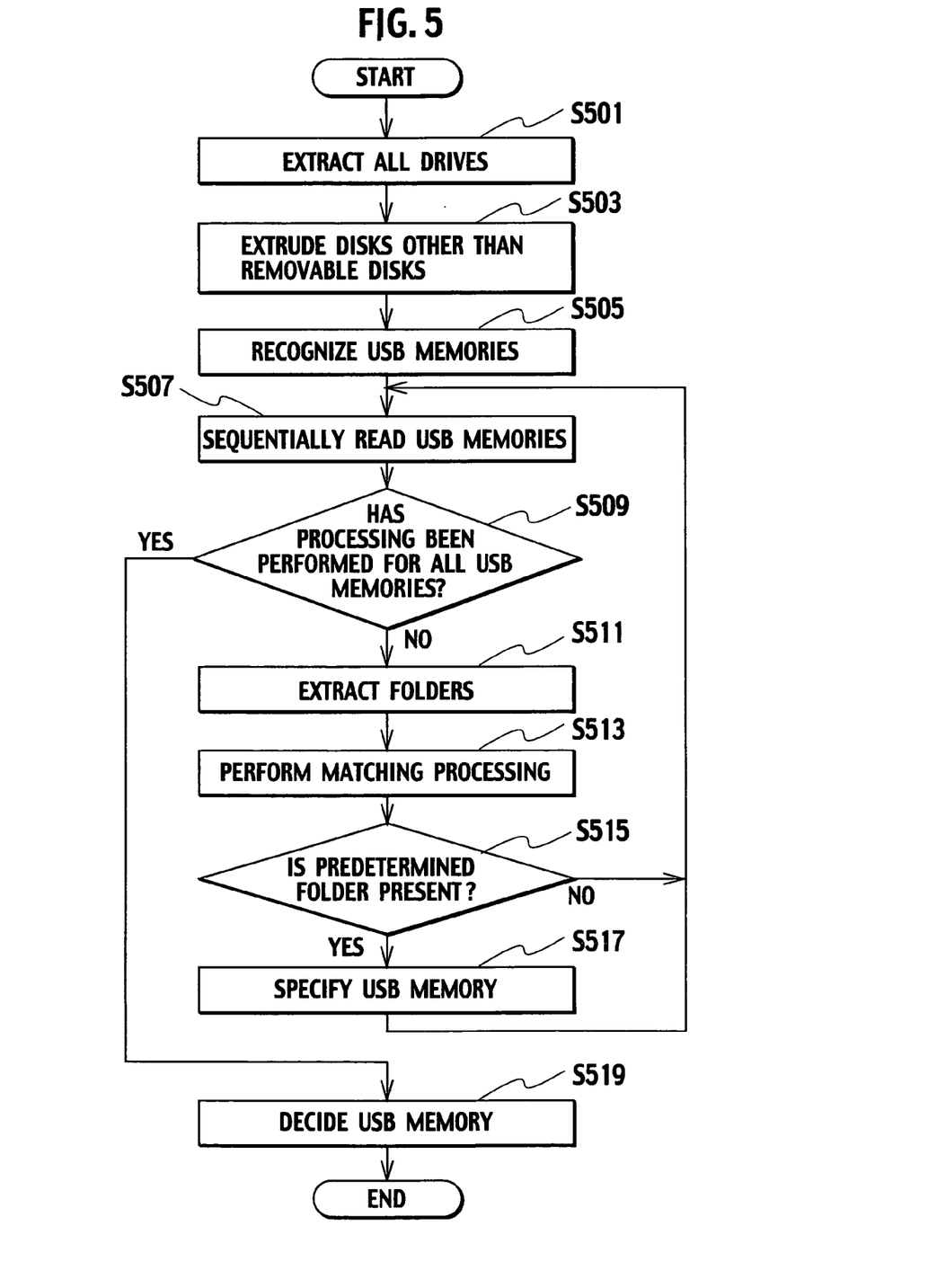
FIG. 5 is a flowchart showing operations of the external storage unit managing system in the embodiment.

A description will be made of processing of the external storage unit managing system 15 in Step S403 shown in FIG. 4 with reference to FIG. 5. FIG. 5 is a flowchart of the processing of the external storage unit managing system 15 for specifying the USB memory.

First, the user performs setting for using the USB memory. FIG. 6 shows a screen 601 for setting so that the USB memory can be used as the storage destination of the print data. On the screen 601, "Output to USB Memory (command to use external storage unit)" is selected from a menu display portion 603 for setting an output method, and an OK button 605 is depressed, whereby the USB memory is set to be used.

Moreover, the case is assumed, where the names of the drives to which the USB memories as the external storage units are connected are set as the E drive, the F drive and the G drive.

In Step S501, the extrusion unit 21 extracts all the drives. In Step S503 and Step S505, the extrusion unit 21 extrudes the disks other than the removable disks, and recognizes the remaining drives as the USB memories.

As a result, only the USB memories are specified among the external storage units, and drive name information corresponding thereto is stored in the drive name data memory 23.

In Step S507, the folder extraction unit 25 sequentially reads the drive name information of the USB memories (USB memories as the drives E, F and G) from the drive name data memory 23.

In Step S509, it is determined whether or not processing (processing of Step S511 to Step S517) has been performed for all the USB memories. When it is determined that not all the USB memories (USB memories as the drives E, F and G) have been subjected to the above-described processing, the processing in FIG. 5 proceeds to Step S511. When it is determined that all the USB memories have been subjected to the above-described processing, the processing in FIG. 5 proceeds to Step S519. In Step S511, the folder extraction unit 25 extracts the folders (identification target information) (refer to FIG. 3A to FIG. 3C). Then, the folder extraction unit 25 associates the extracted folders and the drive names with each other, and stores the associated folders and drive names in the drive-specific folder data memory 27.

In Step S513, the matching unit 29 reads the respective extracted folders (identification target information), and performs matching processing for the extracted folders with the preset folder (registered information).

In Step S515, the matching unit 29 determines whether or not a predetermined folder is present. When the matching unit 29 determines that the predetermined folder is present (in the case where the predetermined conditions are satisfied), the processing in FIG. 5 proceeds to Step S517. When the matching unit 29 determines that the predetermined folder is not present, the processing in FIG. 5 returns to Step S507.

In Step S517, the matching unit 29 specifies the USB memory. Specifically, the USB memory is specified in such a manner that the folder retrieved in Step S515 is stored in the extracted drive name data memory 31. Here, for example, the case is possible, where two or more USB memories having the predetermined folder are retrieved (specifically, the case where two or more drive names are stored in the extracted drive name data memory). In this case, the USB memories can be limited to one by processing of Step S519.

Note that the extrusion unit 21, the folder extraction unit 25 and the like function as the external storage unit retrieval units.

In Step S519, the external storage unit deciding unit 35 decides the USB memory to one. For example, on the display screen displayed by the display control unit 37, in a column for setting a storage destination drive name, the drive name stored in the drive name data memory 31 is read and displayed by the display control unit 37 so as to be selectable. Then, the folder name is displayed in a storage destination folder column.

Then, the user selects the drive name and depresses the OK button, whereby the output destination drive corresponding to the drive name as the output destination is decided. Specifically, the drive name data memory 31 is written to one selected drive name.

Note that another example is shown in FIG. 7. By means of a screen 701, the user can decide the drive name of the USB memory related to the use by directly designating the same. For example, all the drive names designated by the extrusion unit 21 are displayed so as to allow the user to select one thereof.

Specifically, the screen 701 is one for directly deciding the output destination to one. On the screen 701, in a column 703 for setting the storage destination drive name, the drive name is displayed so as to be selectable. Then, the folder created in the USB memory is displayed on a storage destination folder column 705.

Then, the user selects the drive name and depresses an OK button 707, whereby the output destination corresponding to the drive name (as the connected USB memory) as the output destination is decided, and the print data is outputted to the drive concerned.

Note that the present invention is not limited to the above-described examples of the embodiment, and can be carried out in accordance with other embodiments by adding appropriate alterations thereto.

For example, the present invention can be realized as a computer program as follows.

The present invention may be a print data output program that decides an external storage unit related to use from among external storage units connected to a plurality of connection portions to which the external storage units are connectable, and outputs print data to the external storage unit based on a printing instruction, the print data output program allowing a computer to execute: a function as an external storage unit retrieval unit that retrieves the external storage units connected to the connection portions based on a command to use the external storage unit; and a function as an external storage unit deciding unit that, in a case where a plurality of the external storage units connected to the connection portions are retrieved by the external storage unit retrieval unit, decides that an external storage unit satisfying predetermined conditions is the external storage unit related to the use from among the plurality of external storage units.

Moreover, the present invention may be a recording medium that records the above-described print data output program therein.

What is claimed is:

1. A print data output apparatus that decides an external storage unit related to use from among external storage units connected to a plurality of connection portions to which the external storage units are connectable, and outputs print data to the external storage unit based on a printing instruction, the print data output apparatus comprising:
   an external storage unit retrieval unit that retrieves the external storage units connected to the connection portions based on a command to use the external storage unit; and
   an external storage unit deciding unit that, in a case where a plurality of the external storage units connected to the connection portions are retrieved by the external storage unit retrieval unit, decides that an external storage unit satisfying predetermined conditions is the external storage unit related to the use from among the plurality of external storage units,
   wherein respective pieces of identification target information are stored in the plurality of external storage units,
   the external storage unit retrieval unit extracts the respective pieces of identification target information from the plurality of external storage units, and
   the external storage unit deciding unit determines whether or not prestored registered information and extracted identification target information coincide with each other, and determines that an external storage unit satisfying the predetermined conditions is the external storage unit related to the use while defining, as the predetermined conditions, that the registered information and the identification target information coincide with each other,
   the registered information has a predetermined folder configuration for outputting the print data, and
   the external storage unit deciding unit determines whether or not a folder having a same configuration as the predetermined folder configuration is present in the external storage unit, and determines that an external storage unit satisfying the predetermined conditions is the external storage unit related to the use in a case where the folder having the same configuration is present.

2. The print data output apparatus according to claim 1, wherein the external storage unit deciding unit has a display control function to allow a display unit to display thereon a selection screen capable of selecting respective names of drives to which the plurality of external storage units are connected, and
   in a case where there are two or more names of drives to which two or more external storage units related to the use are connected, while defining, as the predetermined conditions, that a name of a drive is selected on the selection screen, the external storage unit deciding unit determines that an external storage unit corresponding to the name of the drive, which is selected on the selection screen, is the external storage unit related to limited use.

3. The print data output apparatus according to claim 1, wherein a temporary folder is set in a local disk,
   a switching unit that freely switches between the temporary folder and the external storage unit related to the use is provided, and
   the switching unit switches a folder of the external storage unit related to the use to an output destination in a case of an output operation based on the command to use the external storage unit.

4. The print data output apparatus according to claim 1, wherein a managing system of the external storage units is communicable with a peripheral apparatus through a network,
   a switching unit that freely switches between the peripheral apparatus and the external storage unit related to the use is provided, and
   the switching unit switches a folder of the external storage unit related to the use to an output destination in a case of an output operation based on the command to use the external storage unit.

5. A print data output method of deciding an external storage unit related to use from among external storage units connected to a plurality of connection portions to which the external storage units are connectable, and outputting print data to the external storage unit based on a printing instruction, the print data output method comprising:
   retrieving the external storage units connected to the connection portions based on a command to use the external storage unit; and
   in a case where a plurality of the external storage units connected to the connection portions are retrieved by the retrieving, deciding that an external storage unit satisfying predetermined conditions is the external storage unit related to the use from among the plurality of external storage units,
   wherein respective pieces of identification target information are stored in the plurality of external storage units,
   the retrieving extracts the respective pieces of identification target information from the plurality of external storage units,
   the deciding determines whether or not prestored registered information and extracted identification target information coincide with each other, and determines that an external storage unit satisfying the predetermined conditions is the external storage unit related to the use while defining, as the predetermined conditions, that the registered information and the identification target information coincide with each other,
   the registered information has a predetermined folder configuration for outputting the print data, and
   the deciding determines whether or not a folder having a same configuration as the predetermined folder configuration is present in the external storage unit, and determines that an external storage unit satisfying the predetermined conditions is the external storage unit related to the use in a case where the folder having the same configuration is present.

6. A non-transitory computer usable medium having a computer readable print data output program embodied therein of deciding an external storage unit related to use from among external storage units connected to a plurality of connection portions to which the external storage units are connectable, and outputting print data to the external storage unit based on a printing instruction, the computer readable print data output program comprising:
- a first print data output program code for causing the computer to retrieve the external storage units connected to the connection portions based on a command to use the external storage unit; and
- a second print data output program code for causing the computer to, in a case where a plurality of the external storage units connected to the connection portions are retrieved by the first print data output program code, decide that an external storage unit satisfying predetermined conditions is the external storage unit related to the use from among the plurality of external storage units,
- wherein respective pieces of identification target information are stored in the plurality of external storage units,
- the first print data output program code causes the computer to extract the respective pieces of identification target information from the plurality of external storage units,
- the second print data output program code causes the computer to determine whether or not prestored registered information and extracted identification target information coincide with each other, and determine that an external storage unit satisfying the predetermined conditions is the external storage unit related to the use while defining, as the predetermined conditions, that the registered information and the identification target information coincide with each other,
- the registered information has a predetermined folder configuration for outputting the print data, and
- the second print data output program code causes the computer to determine whether or not a folder having a same configuration as the predetermined folder configuration is present in the external storage unit, and determine that an external storage unit satisfying the predetermined conditions is the external storage unit related to the use in a case where the folder having the same configuration is present.

7. A print data output apparatus that decides an external storage unit related to use from among external storage units connected to a plurality of connection portions to which the external storage units are connectable, and outputs print data to the external storage unit based on a printing instruction, the print data output apparatus comprising:
- an external storage unit retrieval unit that retrieves the external storage units connected to the connection portions based on a command to use the external storage unit; and
- an external storage unit deciding unit that, in a case where a plurality of the external storage units connected to the connection portions are retrieved by the external storage unit retrieval unit, decides that an external storage unit satisfying predetermined conditions is the external storage unit related to the use from among the plurality of external storage units, the predetermined conditions comprising, in the case of at least one of the external storage units having a folder configuration for output of the print data, extracting respective folder configurations from the plurality of the external storage units, determining whether or not each extracted folder configuration coincides with said folder configuration for output of the print data, and outputting the print data to one of the external storage unit having said folder configuration for output of the print data.

8. A print data output method of deciding an external storage unit related to use from among external storage units connected to a plurality of connection portions to which the external storage units are connectable, and outputting print data to the external storage unit based on a printing instruction, the print data output method comprising:
- retrieving the external storage units connected to the connection portions based on a command to use the external storage unit; and
- in a case where a plurality of the external storage units connected to the connection portions are retrieved by the retrieving, deciding that an external storage unit satisfying predetermined conditions is the external storage unit related to the use from among the plurality of external storage units, the predetermined conditions comprising, in the case of at least one of the external storage units having a folder configuration for output of the print data, extracting respective folder configurations from the plurality of the external storage units, determining whether or not each extracted folder configuration coincides with said folder configuration for output of the print data, and outputting the print data to one of the external storage unit having said folder configuration for output of the print data.

9. A non-transitory computer usable medium having a computer readable print data output program embodied therein of deciding an external storage unit related to use from among external storage units connected to a plurality of connection portions to which the external storage units are connectable, and outputting print data to the external storage unit based on a printing instruction, the computer readable print data output program comprising:
- a first print data output program code for causing the computer to retrieve the external storage units connected to the connection portions based on a command to use the external storage unit; and
- a second print data output program code for causing the computer to, in a case where a plurality of the external storage units connected to the connection portions are retrieved by the first print data output program code, decide that an external storage unit satisfying predetermined conditions is the external storage unit related to the use from among the plurality of external storage units, the predetermined conditions comprising, in the case of at least one of the external storage units having a folder configuration for output of the print data, extracting respective folder configurations from the plurality of the external storage units, determining whether or not each extracted folder configuration coincides with said folder configuration for output of the print data, and outputting the print data to one of the external storage unit having said folder configuration for output of the print data.

* * * * *